United States Patent
Yalavarti et al.

(10) Patent No.: US 11,513,801 B2
(45) Date of Patent: Nov. 29, 2022

(54) CONTROLLING ACCESSES TO A BRANCH PREDICTION UNIT FOR SEQUENCES OF FETCH GROUPS

(71) Applicant: Advanced Micro Devices, Inc., Santa Clara, CA (US)

(72) Inventors: Adithya Yalavarti, Boston, MA (US); John Kalamatianos, Arlington, MA (US); Matthew R. Poremba, Shavertown, PA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 370 days.

(21) Appl. No.: 16/127,093

(22) Filed: Sep. 10, 2018

(65) Prior Publication Data
US 2020/0081716 A1 Mar. 12, 2020

(51) Int. Cl.
*G06F 9/38* (2018.01)
*G06F 1/3287* (2019.01)
*G06F 9/30* (2018.01)

(52) U.S. Cl.
CPC .......... *G06F 9/3806* (2013.01); *G06F 1/3287* (2013.01); *G06F 9/30058* (2013.01)

(58) Field of Classification Search
CPC ....................................................... G06F 9/30
See application file for complete search history.

(56) References Cited

U.S. PATENT DOCUMENTS

| | | | | |
|---|---|---|---|---|
| 5,740,417 A * | 4/1998 | Kennedy | ............... | G06F 9/3867 |
| | | | | 712/240 |
| 9,477,479 B2 * | 10/2016 | Greenhalgh | .......... | G06F 9/3806 |
| 9,552,032 B2 * | 1/2017 | Aggarwal | ................ | G06F 9/38 |
| 9,891,922 B2 * | 2/2018 | Bonanno | ............... | G06F 9/3844 |

* cited by examiner

*Primary Examiner* — Cheng Yuan Tseng
(74) *Attorney, Agent, or Firm* — Park, Vaughan, Fleming & Dowler LLP

(57) ABSTRACT

An electronic device is described that handles control transfer instructions (CTIs) when executing instructions in program code. The electronic device has a processor that includes a branch prediction functional block and a sequential fetch logic functional block. The sequential fetch logic functional block determines, based on a record associated with a CTI, that a specified number of fetch groups of instructions that were previously determined to include no CTIs are to be fetched for execution in sequence following the CTI. When each of the specified number of fetch groups is fetched and prepared for execution, the sequential fetch logic prevents corresponding accesses of the branch prediction functional block for acquiring branch prediction information for instructions in that fetch group.

22 Claims, 10 Drawing Sheets

CONTROLLING ACCESSES TO A BRANCH PREDICTION UNIT FOR SEQUENCES OF FETCH GROUPS

GOVERNMENT RIGHTS

This invention was made with government support under the PathForward Projected with Lawrence Livermore National Laboratory (prime contract no. DE-AC52-07NA27344, subcontract no. B620717) awarded by the Department of Energy (DOE). The government has certain rights in this invention.

BACKGROUND

Related Art

Many processors (e.g., microprocessors) in electronic devices include functional blocks that perform operations for improving the efficiency of executing instructions in program code. For example, some processors include prediction functional blocks that are used to predict paths or flows of instruction execution (i.e., sequences of addresses in memory from which instructions are to be fetched for execution) based on records of one or more prior instances of execution of the instructions. One common prediction functional block is a branch prediction functional block, which predicts the resolution of control transfer instructions (CTIs) in program code such as jumps and returns. Branch prediction functional blocks monitor and record the behavior of CTIs as the CTIs are executed, such as the "taken" or "not-taken" resolutions of CTIs, the target instructions for taken CTIs, etc. Upon again encountering CTIs while executing program code (e.g., detecting CTIs in fetched instructions, etc.), the previously recorded behavior of the CTIs is used for predicting the resolutions of present executions of the CTIs. Based on the predicted resolutions, the processor speculatively fetches and prepares instructions for execution along a predicted path after the CTI while the CTI itself is prepared and executed. In contrast to processors that wait to determine resolutions of CTIs before proceeding or speculatively follow fixed selections of paths from CTIs, such processors can speculatively follow paths from CTIs that are more likely to be the paths that are followed when the CTIs are executed, resulting in lower delays and/or less recovery operations.

In some processors, branch prediction functional blocks are automatically accessed for all instructions early in the process of preparing fetched instructions for execution in order to ensure that predicted resolutions for any CTIs are available as soon as possible for directing paths of program code execution. Because CTI instructions typically form only a small portion of program code, however, many accesses of the branch prediction functional blocks are for instructions that are not CTIs—and therefore waste dynamic energy. Given that each access of the branch prediction functional block has an associated cost in terms of electrical power consumed, etc., avoiding needless accesses of the branch prediction functional block is desirable.

BRIEF DESCRIPTION OF THE FIGURES

Throughout the figures and the description, like reference numerals refer to the same figure elements.

DETAILED DESCRIPTION

Figure 1:
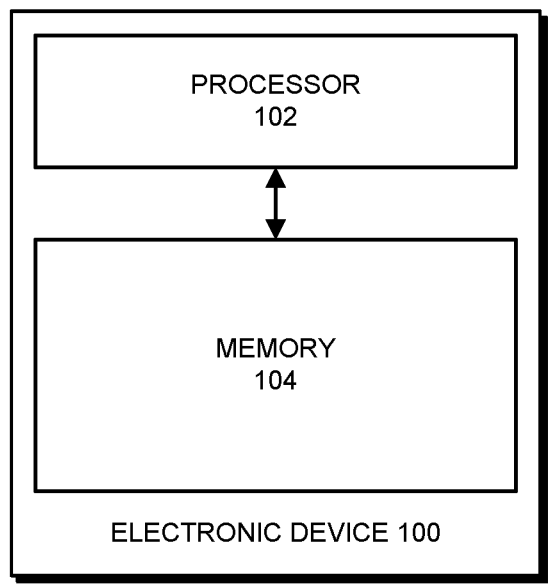
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following are simplified and general descriptions of two of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Control transfer instruction: a control transfer instruction (CTI) is an instruction in program code that, when executed, causes/can cause a jump, displacement, or discontinuity in an otherwise sequential flow of instruction execution. CTIs include "unconditional" CTIs such as jump, call, return, etc., which automatically cause instruction execution to jump from instructions at first memory addresses, the CTIs, to instructions, or "target instructions," at second memory addresses. CTIs also include "conditional" CTIs such as conditional jump instructions, etc., which include, are associated with, or depend on conditions such as greater than, equal to, non-zero, etc. When the corresponding condition is satisfied (e.g., true, false, etc.), a conditional CTI causes a jump in instruction execution from the CTI to an instruction at a second memory address, but, when the condition is not satisfied, instruction execution continues sequentially following the CTI. For example, a conditional branch instruction can be implemented using a condition checking instruction and a conditional CTI (or a single combined instruction), with the branch being "taken," and instruction execution jumping to the target instruction, when the condition is met, and the branch instruction being "not taken" or "falling through," and instruction execution continuing sequentially, when the condition is not met. In some cases, addresses of target instructions are dynamically specified for conditional and/or unconditional CTIs. For example, an address of a target instruction of a CTI can be computed and stored in a processor register or other location by a prior instruction, and then used to determine a location to which instruction execution is to jump upon executing the CTI.

Overview

The described embodiments include a processor in an electronic device. The processor includes functional blocks such as a central processing unit (CPU) core, one or more cache memories, communication interfaces, etc. that perform computational operations, memory operations, communications with other functional blocks and devices, etc. The processor also includes a sequential fetch logic functional block that performs operations for avoiding, when possible, accesses of a branch prediction functional block in the processor for acquiring branch prediction information. In the described embodiments, fetch groups, which are blocks of instructions of a specified size (e.g., 32 bytes, 64 bytes, etc.), are fetched from a cache memory or main memory as a group and prepared for execution in an instruction execution pipeline in the processor. As a given fetch group is fetched and prepared for execution, the sequential fetch logic checks a record associated with the given fetch group (should such a record exist) to determine a number of fetch groups to be fetched in sequence following the given fetch group that were previously determined to include no control transfer instructions ("CTIs"). For example, in some embodiments, the sequential fetch logic checks a record associated with a CTI in the given fetch group to determine the number of fetch groups. As another example, in some embodiments, the sequential fetch logic checks a record associated with a target instruction for a CTI in the given fetch group to determine the number of fetch groups. Because there are no CTIs in the number of fetch groups, the fetch groups will be fetched sequentially—and branch prediction information will not be needed. As each of the number of fetch groups is subsequently fetched and prepared for execution, therefore, the sequential fetch logic prevents the accesses of the branch prediction functional block for acquiring branch prediction information. For example the sequential fetch logic may prevent checks in a branch target buffer (BTB), a branch direction predictor, etc. in the branch prediction functional block for acquiring branch prediction information.

In some embodiments, the BTB is used for storing some or all of the above-described records indicating the number of fetch groups having no CTIs that are to be fetched in sequence following respective CTIs. In these embodiments, along with resolution information for CTIs, the BTB includes information about the number of fetch groups having no CTIs (if any) to be fetched in sequence following the CTIs. During operation, upon encountering a CTI of a specified type in a given fetch group (e.g., detecting, within the given fetch group, the CTI of the specified type), the sequential fetch logic functional block keeps a count of a number of fetch groups that are fetched for execution in sequence following the given fetch group before a subsequent CTI retires (i.e., completes execution and is ready to be committed to the architectural state of the processor). The sequential fetch logic then stores, in an entry in the BTB associated with the CTI, the count of the number of fetch groups. The count in the entry in the BTB is then used as described herein to avoid accesses of a branch prediction functional block for acquiring branch prediction information for the number of fetch groups.

In some embodiments, a sequential fetch table (SFT) is used for storing some or all of the above-described records indicating the number of fetch groups having no CTIs that are to be fetched in sequence following respective CTIs. In these embodiments, entries in the SFT are associated with target instructions for CTIs, so that each record in the SFT includes an indication of a number of fetch groups having no CTIs that are to be fetched in sequence following a particular path/resolution of the corresponding CTI. During operation, upon encountering the retirement of a target instruction for a CTI (i.e., an instruction which is a target of the CTI, whether on the taken or not taken path from the CTI) in a given fetch group, the sequential fetch logic functional block keeps a count of a number of fetch groups that are fetched for execution in sequence before a subsequent CTI retires. The sequential fetch logic then stores, in an entry in the SFT associated with the target instruction, the count of the number of fetch groups. The count in the entry in the SFT is then used as described herein to avoid accesses of a branch prediction functional block for acquiring branch prediction information for the number of fetch groups.

In some embodiments, when using the above-described records to prevent the accesses of the branch prediction functional block for acquiring branch prediction information, the sequential fetch logic acquires the number of fetch groups from a corresponding record (from the BTB, the SFT, or elsewhere) and sets a counter equal to the number of fetch groups. As each subsequent fetch group is fetched and prepared for execution, the sequential fetch logic decrements the counter and prevents access to the branch prediction functional block as described above. After the counter reaches zero, as one or more subsequent fetch groups are fetched and prepared for execution, the sequential fetch logic permits corresponding accesses of the branch prediction functional block to be performed to acquire branch prediction information for instructions in the one or more subsequent fetch groups. In other words, the sequential fetch logic uses the counter to prevent accesses of the branch prediction functional block for a specified number of fetch groups, and then commences performing accesses of the branch prediction functional block for subsequent fetch groups. In some of these embodiments, the sequential fetch logic also halts checks of the records themselves as long as the counter is greater than zero—and portions of functional blocks in which the records are stored (e.g., the BTB, the SFT, etc.) may be powered down, placed in a reduced power mode (e.g., supplied a reduced supply voltage, etc.), or otherwise set to reduce power consumption (e.g., clock gated, etc.).

By using the records indicating the number of fetch groups that do not include CTIs that are to be fetched in sequence following a given CTI to prevent accesses of the branch prediction functional block to acquire branch prediction information for the fetch groups, the described embodiments can avoid unnecessary accesses of the branch prediction functional block. This can help to reduce power consumption in the processor and, more generally, in the electronic device. The reduced power consumption can result in the electronic device being less expensive to use, to more efficiently use battery power, etc., which can result in higher user satisfaction with the electronic device.

Electronic Device

FIG. 1 presents a block diagram illustrating electronic device 100 in accordance with some embodiments. As can be seen in FIG. 1, electronic device 100 includes processor 102 and memory 104. Generally, processor 102 and memory 104 are implemented in hardware, i.e., using various circuit elements and devices. For example, processor 102 and memory 104 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, processor 102 and memory 104 perform operations for preventing accesses of a branch prediction functional block for certain fetch groups.

Processor 102 is a functional block that performs computational and other operations (e.g., control operations, configuration operations, etc.) in electronic device 100. For example, processor 102 can be or include one or more microprocessors, central processing unit (CPU) cores, and/or another processing mechanism.

Memory 104 is functional block in electronic device 100 that performs operations of a memory (e.g., a "main" memory) for electronic device 100. Memory 104 includes volatile memory circuits such as fourth-generation double data rate synchronous DRAM (DDR4 SDRAM) and/or other types of memory circuits for storing data and instructions for use by functional blocks in electronic device 100 and control circuits for handling accesses of the data and instructions that are stored in the memory circuits and for performing other control or configuration operations.

Electronic device 100 is simplified for illustrative purposes. In some embodiments, however, electronic device 100 includes additional or different functional blocks, subsystems, elements, and/or communication paths. For example, electronic device 100 may include display subsystems, power subsystems, input-output (I/O) subsystems, etc. Electronic device 100 generally includes sufficient functional blocks, etc. to perform the operations herein described.

Electronic device 100 can be, or can be included in, any device that performs computational operations. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Processor

Figure 2:
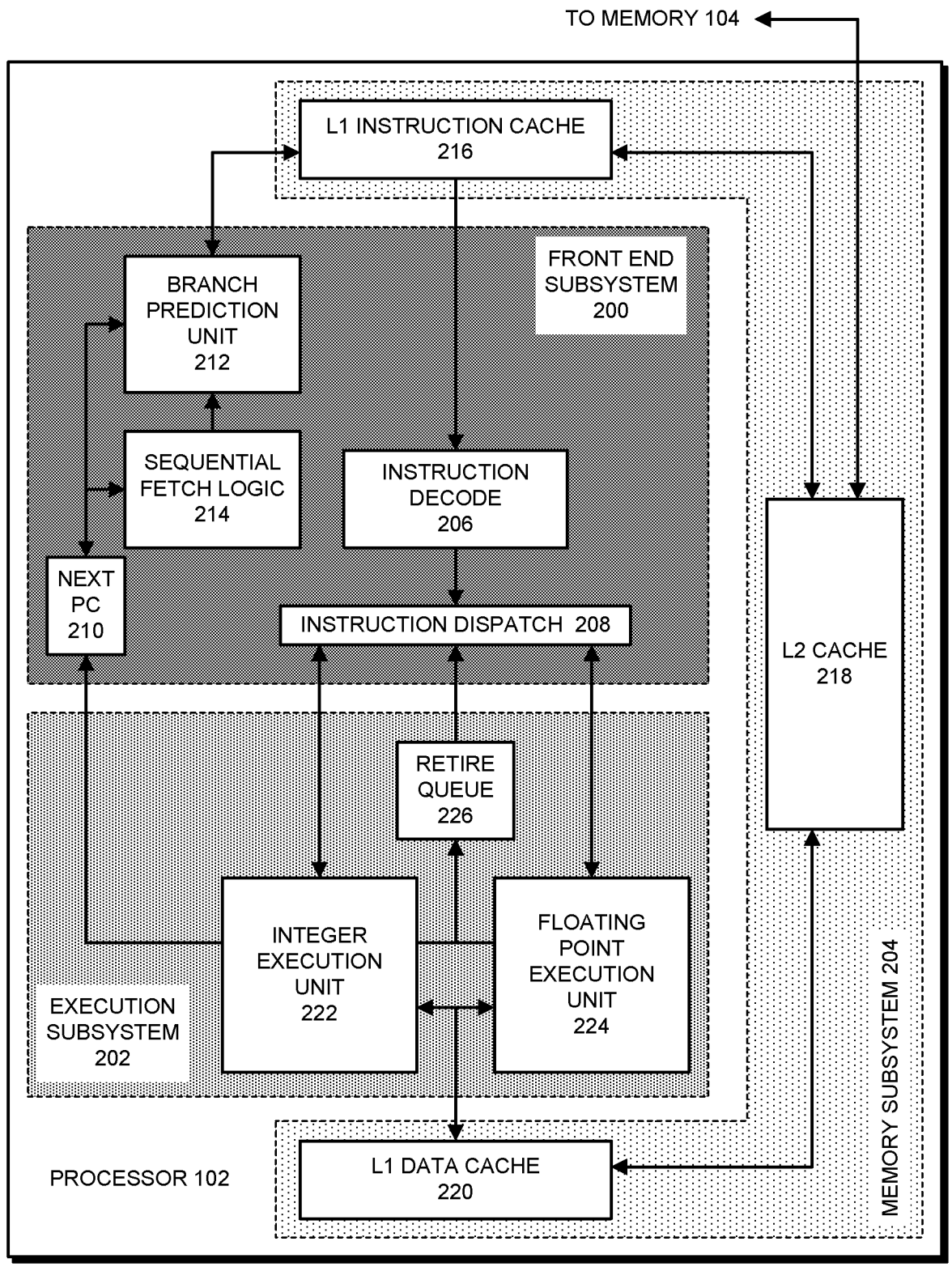
FIG. 2 presents a block diagram illustrating a processor in accordance with some embodiments.

As described above, electronic device 100 includes processor 102, which can be a microprocessor, a CPU core, and/or another processing mechanism. FIG. 2 presents a block diagram illustrating processor 102 in accordance with some embodiments. Although certain functional blocks are shown in FIG. 2, in some embodiments, different arrangements, connectivity, numbers, and/or types of functional blocks may be present in processor 102. Generally, processor 102 includes sufficient functional blocks to perform the operations described herein.

As can be seen in FIG. 2, the functional blocks in processor 102 can be considered as part of a front end subsystem 200, an execution subsystem 202, or a memory subsystem 204. Front end subsystem 200 includes functional blocks that perform operations for acquiring instructions from cache memories or main memory in, or in communication with, memory subsystem 204 and prepare the instructions for dispatch to execution unit functional blocks in execution subsystem 202.

Front end subsystem 200 includes instruction decode 206, which is a functional block that performs operations relating to the decoding and preparation for execution of fetched instructions. Instruction decode 206 fetches or otherwise receives, from L1 instruction cache 216, L2 cache 218, L3 cache (not shown), or main memory (not shown), instructions in N-byte fetch groups (e.g., four instructions in a 32-byte fetch group, etc.). Instruction decode 206 then, possibly in parallel, decodes the instructions in the fetch group into respective micro-operations. Instruction decode 206 next sends the micro-operations to instruction dispatch 208 to be forwarded to the appropriate execution unit in execution subsystem 202 for execution.

Front end subsystem 200 also includes next PC 210, which is a functional block that performs operations for determining a program counter, or address in memory, from which a next fetch group is to be fetched. Next PC 210, based on an initial or current value of the program counter, computes a next sequential value for the program counter. For example, given 32-byte fetch groups, next PC 210 may compute next address=current address+32 bytes. When taken CTIs do not change program flow, front end subsystem 200 uses the sequential values of the program counter that are computed by next PC 210 for fetching fetch groups from corresponding sequential addresses in memory.

Front end subsystem 200 further includes branch prediction unit 212, which is a functional block that performs operations for predicting the resolutions of CTIs in fetch groups and modifying the program counter and thus the address in memory from which subsequent fetch groups are fetched. In other words, branch prediction unit 212, using one or more records of CTI behavior, predicts a "taken" or "not-taken" resolution of CTIs and provides a predicted target address for taken CTIs. When CTIs are predicted taken by branch prediction unit 212, a next or subsequent program counter provided by next PC 210 may be replaced using a target address returned by branch prediction unit 212.

Figure 3:
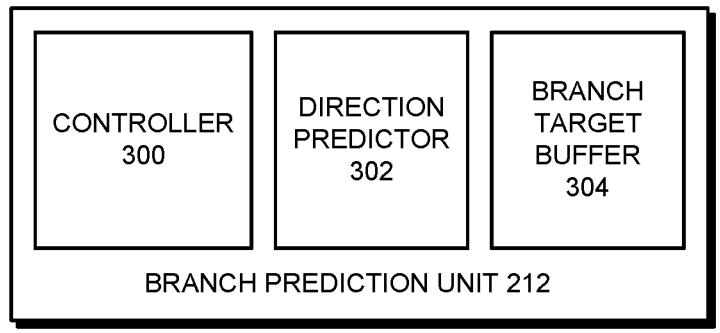
FIG. 3 presents a block diagram illustrating a branch prediction unit in accordance with some embodiments.

FIG. 3 presents a block diagram illustrating branch prediction unit 212 in accordance with some embodiments.

Although branch prediction unit 212 is shown in FIG. 3 with various functional blocks, branch prediction unit 212 is simplified for the purposes of this description; in some embodiments different functional blocks are present in branch prediction unit 212. For example, in some embodiments, multi-level branch prediction, branch pattern predictors, multi-level branch target buffers and/or direction predictors, and/or other branch prediction mechanisms or techniques are used, and corresponding functional blocks are included in branch prediction unit 212. Generally, branch prediction unit 212 includes sufficient functional blocks to perform the operations herein described.

As can be seen in FIG. 3, the functional blocks in branch prediction unit 212 include controller 300, direction predictor 302, and branch target buffer (BTB) 304. Controller 300 includes circuit elements for performing operations of the branch prediction unit 212, such as updates of and lookups in direction predictor 302 and branch target buffer 304, communication with other functional blocks, etc. Direction predictor 302 includes a record such as a lookup table, a list, etc. that has a number of entries, each entry for storing an address associated with a CTI and an indication of a taken or not-taken resolution of the CTI. For example, for a CTI at address A, direction predictor 302 may include an entry that associates address A or a value based thereon with a corresponding prediction (e.g., a saturating counter, etc.) of a taken or not taken resolution of the CTI. Branch target buffer 304 includes a record such as a lookup table, a list, etc., that has a number of entries, each entry for storing an address associated with a CTI and an indication of a target address for the CTI. For example, for the CTI at address A, branch target buffer 304 may include an entry that associates address A or a value based thereon with a corresponding absolute or relative address for the target instruction of the CTI. While executing instructions, controller 300, based on actual outcomes of CTI instructions, can store and/or update corresponding entries in direction predictor 302 and/or branch target buffer 304, thereby storing values used in the above-described prediction of CTI instruction resolutions.

Figure 4:
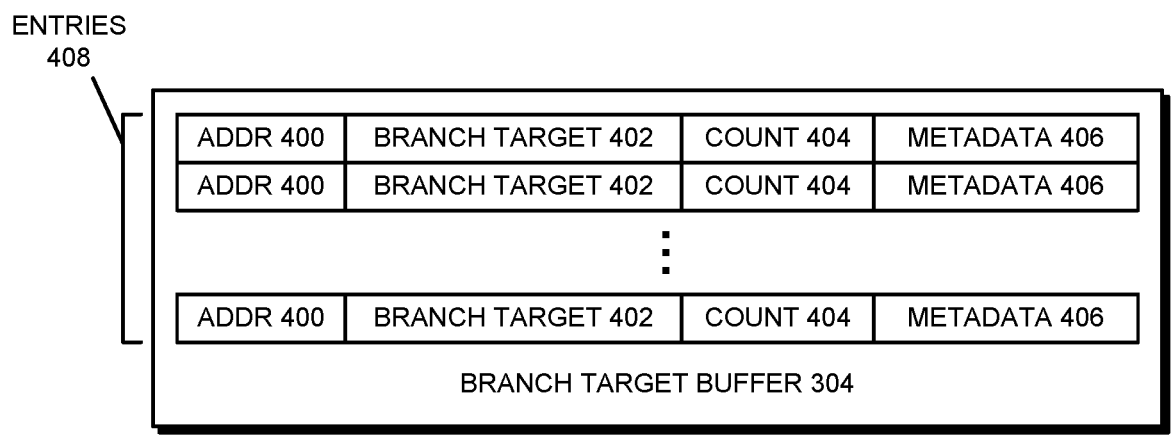
FIG. 4 presents a block diagram illustrating a branch target buffer in accordance with some embodiments.

In some embodiments, in addition to branch target information, branch target buffer 304 is used for storing records of counts of numbers of fetch groups that were fetched for execution in sequence following CTIs before subsequent CTIs retire. In these embodiments, each entry includes a location in which a count, e.g., a number, a string, etc., associated with the corresponding CTI is stored, should such a count be available. For example, the count may be stored in eight bits that are reserved for this purpose in the entries. FIG. 4 presents a block diagram illustrating branch target buffer 304 in accordance with some embodiments. Although branch target buffer 304 is shown as storing certain information, branch target buffer 304 is simplified for the purposes of this description; in some embodiments different arrangements of information are stored in entries in branch target buffer 304. Generally, branch target buffer 304 stores sufficient information to perform the operations herein described.

As can be seen in FIG. 4, branch target buffer 304 includes a number of entries 408, each entry including address (ADDR) 400, branch target 402, count 404, and metadata 406. Address 400 is used for storing an address or a value based thereon of, for, or otherwise associated with a CTI for which an entry holds information. Branch target 402 is used for storing an address, or a value based thereon, of a target instruction for a CTI for which the entry holds information—and thus which can be used to predict an address of a target instruction when the CTI is again executed. Count 404 is used for storing a count of a number of fetch groups that were fetched for execution in sequence following the CTI for which the entry holds information before a subsequent CTI retired. Metadata 406 is used for storing information about or associated with the entry, the count, and/or the CTI, such as valid bits, permission bits, etc.

Returning to FIG. 2, front end subsystem 200 further includes sequential fetch logic 214, which is a functional block that performs operations for avoiding, when possible, accesses of a branch prediction functional block for acquiring branch prediction information. Sequential fetch logic 214 uses records associated with fetch groups to determine a number of fetch groups to be fetched in sequence following a given fetch group (or an instruction therein) that were previously determined to include no CTIs. As each of the number of fetch groups is subsequently fetched, sequential fetch logic 214 prevents the accesses of branch prediction unit 212 for acquiring branch prediction information.

Figure 5:
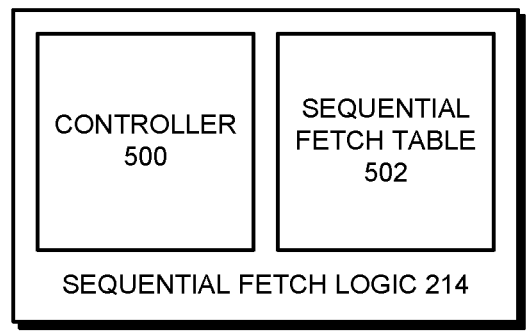
FIG. 5 presents a block diagram illustrating sequential fetch logic in accordance with some embodiments.

FIG. 5 presents a block diagram illustrating sequential fetch logic 214 in accordance with some embodiments. Although sequential fetch logic 214 is shown in FIG. 5 with various functional blocks, sequential fetch logic 214 is simplified for the purposes of this description; in some embodiments different functional blocks are present in sequential fetch logic 214. For example, although sequential fetch logic 214 is shown as including sequential fetch table 502, in some embodiments, sequential fetch logic 214 does not include or use a sequential fetch table. Instead, sequential fetch logic 214 uses count information stored in entries in branch target buffer 304 for performing corresponding operations. Generally, sequential fetch logic 214 includes sufficient functional blocks to perform the operations herein described.

Figure 6:
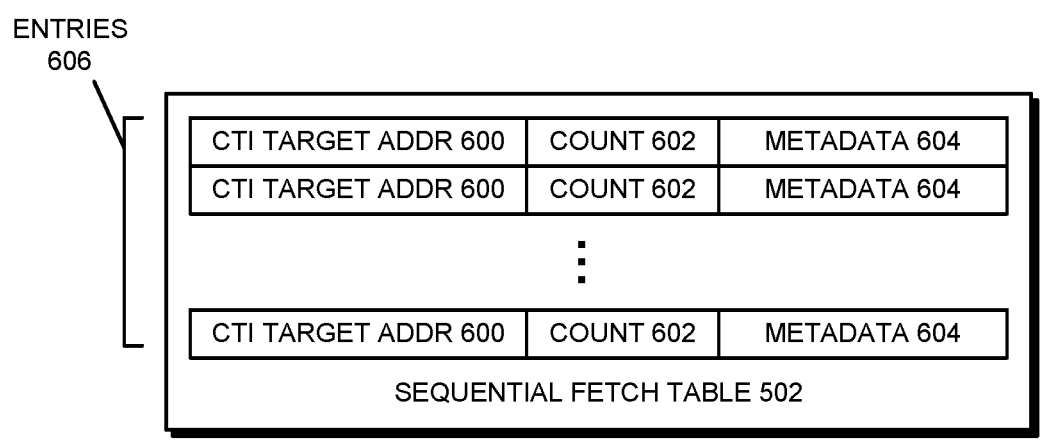
FIG. 6 presents a block diagram illustrating a sequential fetch table in accordance with some embodiments.

As can be seen in FIG. 5, the functional blocks in sequential fetch logic 214 include controller 500 and sequential fetch table 502. Controller 500 includes circuit elements for performing operations of the sequential fetch logic 214, such as updates of and lookups in sequential fetch table 502 (or branch target buffer 304), communication with other functional blocks, etc. Sequential fetch table 502 includes a record such as a lookup table, a list, etc. that has a number of entries, each entry for storing an address associated with a target instruction of a CTI and a record of a count of a number of fetch groups that were fetched for execution in sequence before a subsequent CTI retired. FIG. 6 presents a block diagram illustrating sequential fetch table 502 in accordance with some embodiments. Although sequential fetch table 502 is shown as storing certain information, sequential fetch table 502 is simplified for the purposes of this description; in some embodiments different arrangements of information are stored in entries in sequential fetch table 502. Generally, sequential fetch table 502 stores sufficient information to perform the operations herein described.

As can be seen in FIG. 6, sequential fetch table 502 includes a number of entries 606, each entry including CTI target address (ADDR) 600, count 602, and metadata 604. CTI target address 600 is used for storing an address or a value based thereon of, for, or otherwise associated with a target instruction for a CTI for which an entry holds information. Generally, a "target" instruction of a CTI is an instruction, and thus an address in memory, to which program flow jumps when the CTI is executed. For an unconditional CTI with a statically defined target such as a static-target jump instruction, there is only one target instruction—and thus program flow always jumps to the same address in memory from the CTI instruction. For a conditional CTI, however, there are at least two target instructions (on the taken and not-taken paths in program code), and there can be any number of target instructions. For example, an indirect CTI, for which a target instruction is specified at runtime, can have any number of target instructions on the taken path, although the non-taken path is sequential. Because sequential fetch table 502 stores records associated with target instructions for CTIs, each potential target instruction for (and thus path from) a given CTI may have an associated separate entry in sequential fetch table 502. Count 602 is used for storing a count of a number of fetch groups that were fetched for execution in sequence following the corresponding CTI before a subsequent CTI retired. Metadata 604 is used for storing information about or associated with the entry and/or the count, such as valid bits, permission bits, etc.

In embodiments in which sequential fetch table 502 is used for storing the above-described records for determining numbers of fetch groups, upon receiving a program counter, i.e., an address from which the given fetch group is to be fetched, controller 500 performs a lookup in sequential fetch table 502 to determine if an entry with an associated address is present in sequential fetch table 502. In other words, the lookup determines if an address of an instruction that is present within the multiple addresses in the range of addresses in the given fetch group, i.e., a target instruction of a CTI, is to be found in sequential fetch table 502. If so, controller 500 acquires a corresponding count from count 602 and then uses the count as the number of fetch groups for preventing accesses of branch prediction unit 212 for acquiring branch prediction information. Otherwise, when no matching address is found in sequential fetch table 502, controller 500 does not prevent accesses of branch prediction unit 212, i.e., allows the acquisition of branch prediction information to proceed normally.

In embodiments in which branch target buffer 304 is used for storing the above-described records for determining numbers of fetch groups, as part of performing a lookup for branch prediction information for a CTI in a fetch group, branch prediction unit 212 acquires, from branch target buffer 304, should such a target address exist, addresses of a predicted target instruction for the CTI. Branch prediction unit 212 also acquires, from branch target buffer 304, count 404, which is returned to controller 500 in sequential fetch logic 214. Controller 500 uses the count as the number of fetch groups for preventing accesses of branch prediction unit 212 for acquiring branch prediction information. Otherwise, when no matching address and/or count is found in branch target buffer 304, controller 500 does not prevent accesses of branch prediction unit 212, i.e., allows the acquisition of branch prediction information to proceed normally.

In some embodiments, sequential fetch table 502 includes only a limited number of entries (e.g., 32 entries, 64 entries, etc.) and thus may become filled to capacity during operation of processor 102. When sequential fetch table 502 is full, existing information in an entry will need to be overwritten in order for new information to be stored in sequential fetch table 502. In some embodiments, the entries in sequential fetch table 502 are managed by controller 500 using one or more replacement policies, guidelines, etc. In these embodiments, when choosing an entry to be overwritten, the entry is chosen in accordance with the replacement policies, guidelines, etc. For example, controller 500 may manage information in entries in sequential fetch table 502 using a least-recently-used replacement policy.

Note that although sequential fetch logic 214 is shown as a single functional block that is separate from other functional blocks in FIG. 2, in some embodiments, some or all of sequential fetch logic 214 can be included in other functional blocks shown in FIG. 2. In these embodiments, operations ascribed to sequential fetch logic 214 may be performed by circuit elements in other functional blocks. Generally, sequential fetch logic 214 includes the various circuit elements used to perform the described operations, without limit as to the particular locations of circuit elements in processor 102 shown in FIG. 2.

Returning to FIG. 2, execution subsystem 202 includes integer execution unit 222 and floating point execution unit 224 (collectively, "execution units), which are functional blocks that perform operations for executing integer and floating point instructions, respectively. The execution units include elements such as renaming hardware, execution schedulers, arithmetic logic units (ALUs), floating point multiply and add units (in floating point execution unit 224), register files, etc.

Execution subsystem also includes retire queue 226, which is a functional block in which the results of executed instructions are held after the corresponding instructions have completed execution, but prior to the results being committed to an architectural state of processor 102 (e.g., written to a cache or memory and made available for use in other operations). In some embodiments, certain instructions can be executed out of program order and retire queue 226 is used in ensuring that results of out-of-order instructions are retired properly with respect to other out-of-order instructions.

In some embodiments, retire queue 226 performs at least some of the operations for keeping counts of numbers of fetch groups that are fetched for execution in sequence following a CTI before a subsequent CTI retires. For example, in some embodiments, front end subsystem 200 (e.g., instruction decode 206) includes, along with CTIs to be executed in execution subsystem 202, an indication that the instructions are (or are not) CTIs. For instance, front end subsystem 200 may set a specified flag bit in metadata bits that accompany instructions through execution subsystem 202. Upon encountering an instruction that is indicated to be a CTI, retire queue 226 may begin to keep a count of fetch groups (or, more generally, individual instructions) that retire before a subsequent instruction that is indicated to be a CTI retires. The count can then be communicated to sequential fetch logic 214 in order to be stored for future use as described herein. In some embodiments, counts are not reported by retire queue 226 (or are not used to update any records) unless the counts exceed a corresponding threshold.

Memory subsystem 204 includes a hierarchy of caches, which are functional blocks that include volatile memory circuits for storing limited numbers of copies of instructions and/or data near the functional blocks that use the instructions and/or data, as well as control circuits for handling operations such as accesses of the data. The hierarchy includes two levels, with level one (L1) instruction cache 216 and L1 data cache 220 on the first level, and L2 cache 218 on the second level. Memory subsystem 204 is communicatively coupled to memory 104 and may be coupled to an external L3 cache (not shown). Memory 104 may be coupled to a non-volatile mass storage device that functions as long-term storage for instructions and/or data (e.g., a disk drive or solid state drive) (not shown).

Figure 7:
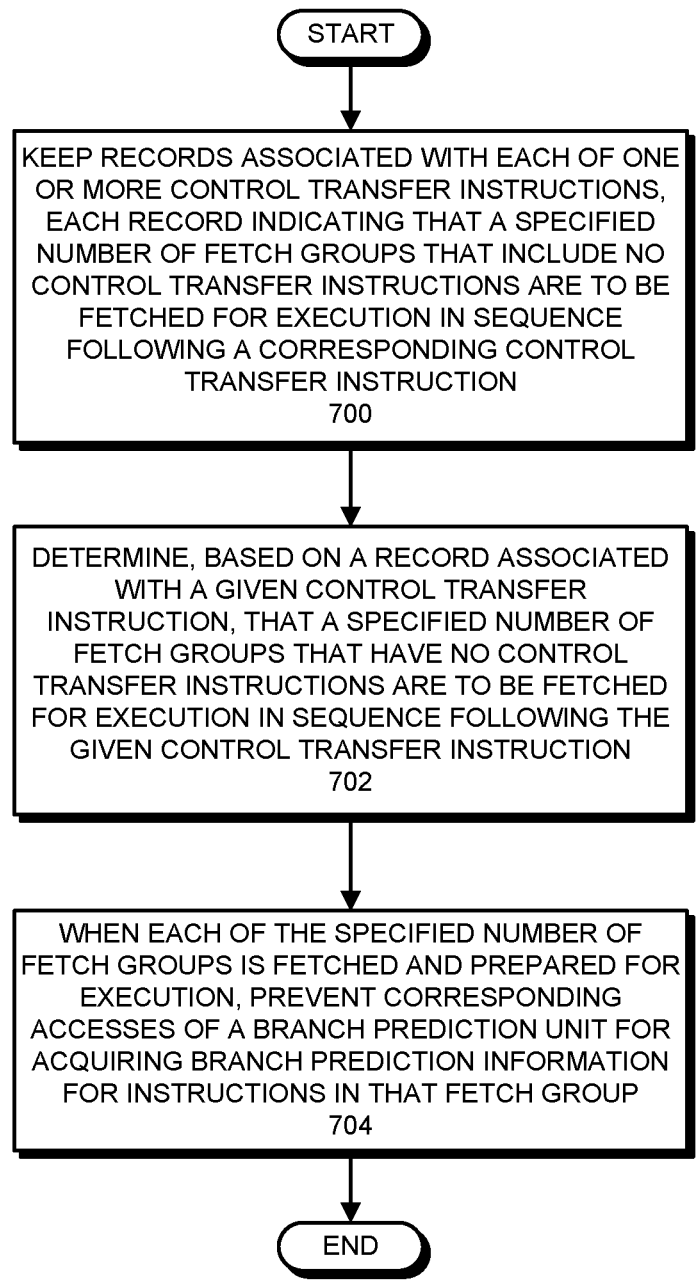
FIG. 7 presents a flowchart illustrating a process for using records associated with control transfer instructions to prevent accesses of a branch prediction unit in accordance with some embodiments.

Using Records of Sequential Fetch Groups Associated with Control Transfer Instructions to Avoid Accessing a Branch Predictor In the described embodiments, a processor (e.g., processor 102) in an electronic device uses records associated with CTIs to determine a number of fetch groups that do not include CTIs that are to be fetched sequentially following the CTIs and prevents, for the number of fetch groups, accesses of a branch prediction unit to acquire corresponding branch prediction information. FIG. 7 presents a flowchart illustrating a process for using records associated with CTIs to prevent accesses of a branch prediction unit in accordance with some embodiments. Note that the operations shown in FIG. 7 are presented as a general example of operations performed by some embodiments. The operations performed by other embodiments include different operations and/or operations that are performed in a different order. For the example in FIG. 7, a processor in an electronic device having a similar internal arrangement to processor 102 is described as performing various operations. In some embodiments, however, a processor having a different internal arrangement performs the described operations.

The operations shown in FIG. 7 start when a processor keeps records associated with each of one or more CTIs, each record indicating that a specified number of fetch groups that include no CTIs are to be fetched in sequence following a corresponding CTI (step 700). During this operation, a controller in sequential fetch logic (e.g., controller 500 in sequential fetch logic 214) receives, from a retire queue (e.g., retire queue 226), an indication of or identifier for a CTI and a number of fetch groups that are to be fetched in sequence following the CTI. For example, assuming an embodiment in which fetch groups include four instructions, if the retire queue encounters a CTI and then counts 129 instructions before the next CTI retires, the retire queue can communicate, along with an identification of the CTI, the value 129 or another value, such as 32 (which is 129/4 rounded down to the nearest integer to represent the number of fetch groups), to the sequential fetch logic. (As used herein, "encountering" a CTI includes detecting a CTI among retiring instructions based on a processor flag associated with the CTI, detecting a behavior or pattern in instruction flow associated with the CTI and/or subsequent instructions or result values, etc.) The controller then updates a record associated with the CTI to indicate the specified number of fetch groups.

Figure 8:
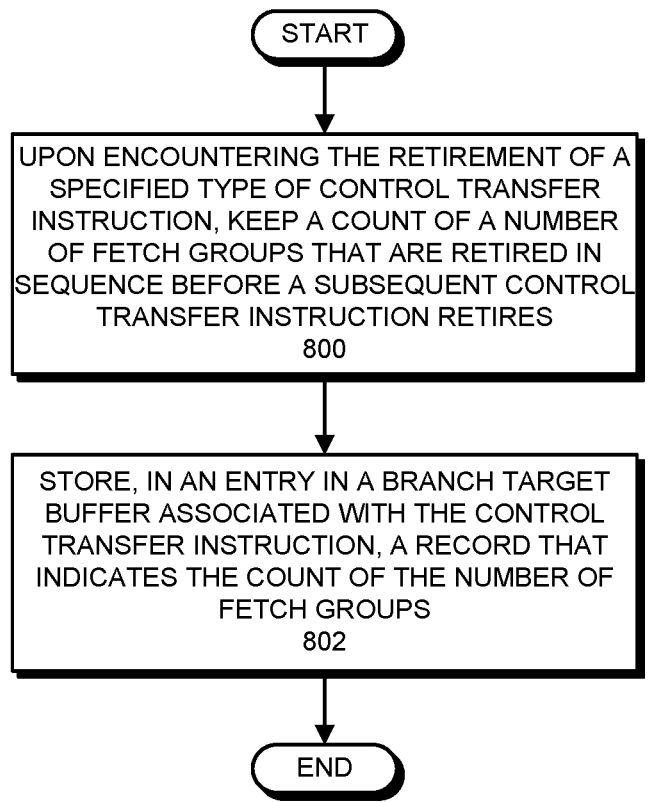
FIG. 8 presents a flowchart illustrating operations performed for keeping the records associated with control transfer instructions when a branch target buffer is used for storing the records in accordance with some embodiments.
Figure 10:
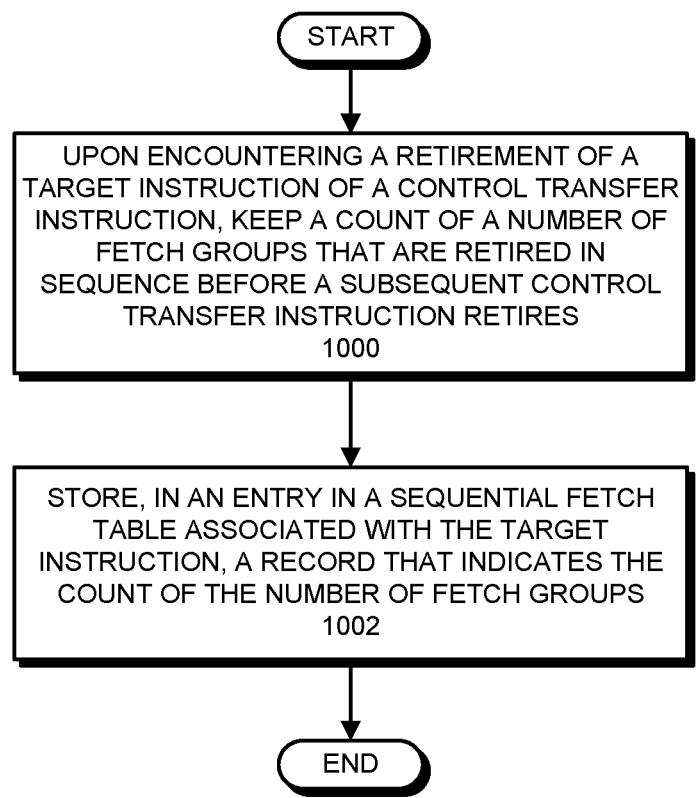
FIG. 10 presents a flowchart illustrating operations performed for keeping the records associated with control transfer instructions when a sequential fetch table is used for storing the records in accordance with some embodiments.

FIGS. 8 and 10 present flowcharts illustrating operations performed for keeping the records associated with the one or more CTIs as described for step 700 of FIG. 7. FIG. 8 presents a flowchart illustrating operations performed for keeping the records associated with the CTIs when a branch target buffer is used for storing the records in accordance with some embodiments. FIG. 10 presents a flowchart illustrating operations performed for keeping the records associated with the CTIs when a sequential fetch table is used for storing the records in accordance with some embodiments. Note that the operations shown in FIGS. 8 and 10 are presented as a general example of operations performed by some embodiments. The operations performed by other embodiments include different operations, operations that are performed in a different order, and/or operations that are performed by different functional blocks.

The operations shown in FIG. 8 start when the retire queue, upon encountering the retirement of a specified type of CTI, begins to keep a count of a number of fetch groups (or, more generally, retired individual instructions) that are retired in sequence before a subsequent CTI retires (step 800). For this operation, the retire queue monitors for the retirement of a CTI instruction of the specified type and then keeps the count of the subsequent instructions that retire before the next CTI instruction. For example, the retire queue can increment a counter for each retired instruction following a CTI instruction of the specified type until the next CTI retires.

As described above, the branch target buffer is used to store the records in the embodiment shown in FIG. 8. In some embodiments, the branch target buffer stores branch target records indexed by an identifier for the CTI (e.g., an address of the CTI instruction in memory) or the fetch group in which the CTI is included. For this reason, in these embodiments, the count information in the entry in the branch target buffer will be associated only with the CTI or the fetch group—and not the CTI's (possibly numerous) target instruction(s). In other words, the above-described count information, which is a single piece of data, represents only a single decision path from the CTI through a respective target instruction. Such records in the branch target buffer cannot therefore reliably be used for determining a count of sequential fetch groups for all possible resolutions of static-target instruction conditional CTIs and/or CTIs which have dynamically-specified target instructions. In some embodiments, therefore, the "specified" type of CTI is an unconditional static target instruction CTI or the non-taken path from a conditional CTI.

The retire queue then communicates the count to the sequential fetch logic, which stores, in an entry in the branch target buffer associated with the CTI or the fetch group, a record that indicates the count of the number of fetch groups (step 802). For this operation, the sequential fetch logic determines an entry in the branch target buffer into which the record is to be stored, such as by determining an address of the CTI or a value based thereon and determining the corresponding entry in the branch target buffer. The sequential fetch logic next stores, in the determined entry, the record that indicates the count of the number of fetch groups. For example, when the entry in the branch target buffer includes space for an eight bit value, the sequential fetch logic stores an eight bit value representing the count in the entry. In the event that the entry is insufficient in size for storing the count (e.g., the count is more than 255 for an eight-bit count value), a default or zero value can be stored in the entry—thereby indicating that accesses of the branch predictor are to be performed (not prevented) for the particular CTI. Alternatively, a maximum value can be stored in the entry, thereby enabling the avoidance of at least some of the accesses of the branch predictor.

Figure 9:
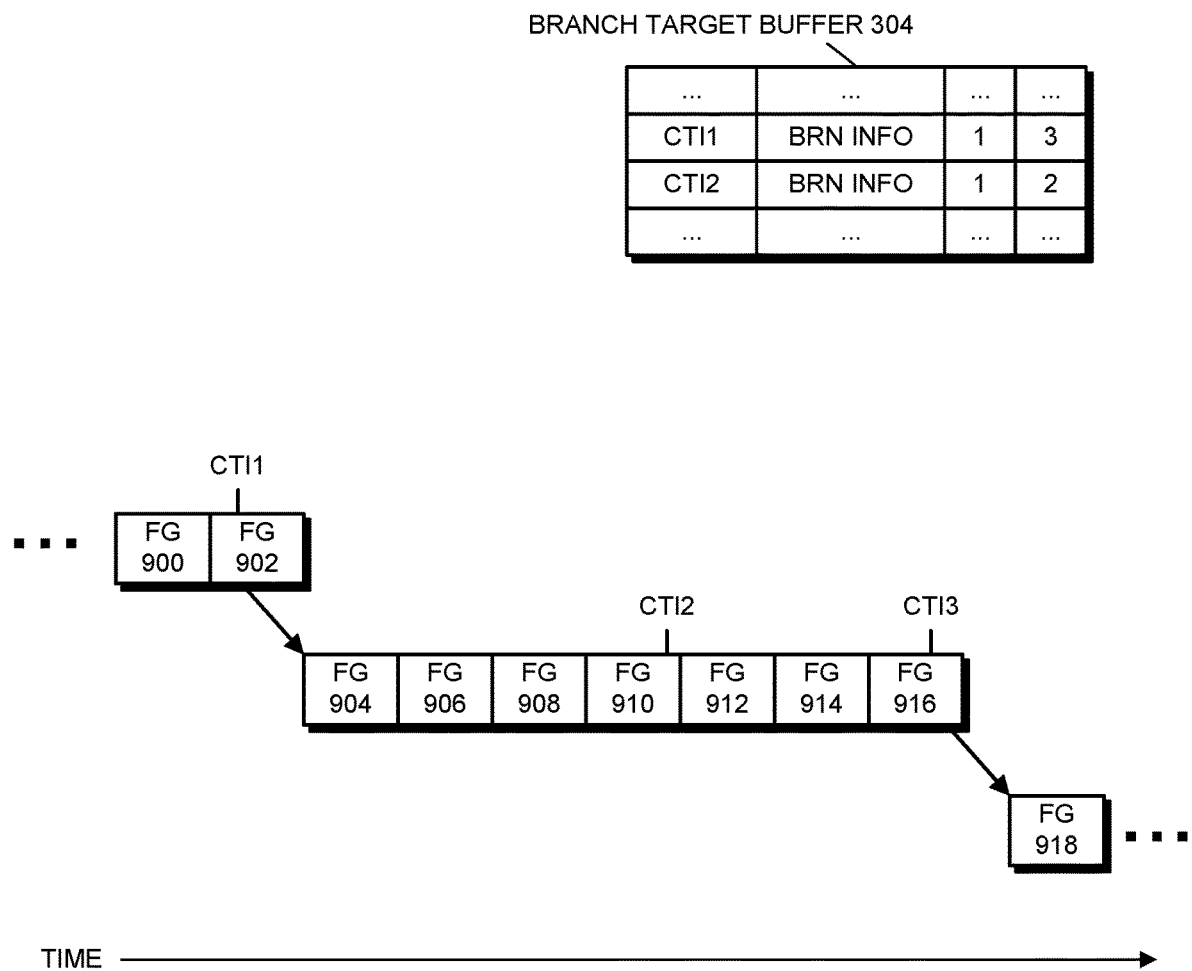
FIG. 9 presents a timeline diagram of operations for updating a branch target buffer with a count of fetch groups that do not include control transfer instructions that are fetched in sequence following corresponding control transfer instructions in accordance with some embodiments.

FIG. 9 presents a timeline diagram of operations for updating a branch target buffer with a count of fetch groups that do not include CTIs that are fetched in sequence following corresponding CTIs in accordance with some embodiments. As shown in FIG. 9, time proceeds from left to right, and during the time a number of fetch groups (FG) that each include separate sets of instructions from program code are fetched, prepared for execution (e.g., decoded, dispatched, etc.), executed, and retired. Each fetch group includes a number of individual instructions (e.g., four, six, etc.) and there are three CTI instructions among the instructions in the fetch groups.

In FIG. 9, a first CTI instruction, CTI1, which is the second instruction in fetch group 902, is a static unconditional branch instruction that causes instruction flow to jump from fetch group 902 at a first address to fetch group 904 at a second, non-sequential address, which is illustrated by the arrow from the second instruction in fetch group 902 to the initial instruction of fetch group 904. Upon detecting the retirement of CTI1 (which is one of the specified types of CTI), retire queue keeps a count of a number of fetch groups that are retired in sequence (i.e., for which the constituent instructions are retired) before a subsequent CTI retires—which is a not-taken conditional CTI2 with a static target address that is the third instruction in fetch group 910. Because three fetch groups (fetch groups 904-908) retired before CTI2 retired, retire queue communicates an identification of CTI1 (e.g., an address of, a processor instruction tag or internal identifier, etc.) and the count value of three or another value, such as the number of instructions that retired—14, to the sequential fetch logic. Upon receiving the identifier of CTI1 and the value, sequential fetch logic updates a corresponding entry in the branch target buffer as shown in the entry for CTI1 in the example of the branch target buffer in FIG. 9. Note that CTI1 and CTI2 as shown in the branch target buffer in FIG. 9 may be the addresses of CTI1 and CTI2 or other values representing or identifying CTI1 and CTI2, such as addresses associated with corresponding fetch groups.

The second CTI instruction, CTI2, which served as the end of the count for CTI1, also causes retire queue to commence a second/corresponding count. As described above, CTI2 is not taken, so fetch groups are fetched from next addresses in sequence (as generated by a next PC functional block) and retire queue keeps the corresponding count until a subsequent CTI, CTI3 in fetch group 916 (which directs program flow to fetch group 918), retires. Because two full fetch groups (fetch groups 912-914) retired before CTI3 retired, retire queue communicates an identification of CTI2 and the count value of two or another value, such as the number of instructions that retired—10, to the sequential fetch logic. Upon receiving the identifier of CTI2 and the value, sequential fetch logic updates a corresponding entry in the branch target buffer, as shown as CTI2, in the example of the branch target buffer in FIG. 9. Note that CTI2 is the not-taken path case of a conditional CTI and thus is one of the specified types of CTI—in some embodiments, the taken path is not similarly tracked and recorded.

Proceeding to FIG. 10, the operations shown in FIG. 10 start when the retire queue, upon encountering the retirement of a target instruction for a CTI, begins to keep a count of a number of fetch groups (or, more generally, retired individual instructions) that are retired in sequence before a subsequent CTI retires (step 1000). For this operation, the retire queue monitors for a CTI and then the retirement of the target instruction of the CTI (i.e., the next instruction in sequence following the CTI) and keeps the count of the subsequent instructions that retire before the next CTI instruction. For example, the retire queue can increment a counter for each retired instruction following the target instruction of the specified type until the next CTI retires.

As described above, the sequential fetch table is used to store the records in the embodiment shown in FIG. 10. In some embodiments, the sequential fetch table stores records associated with target instructions for CTIs. In other words, in these embodiments, the sequential fetch table can include a record associated with each possible target instruction for a CTI—and thus each path taken from the CTI. For this reason, the various types of CTI can be handled (i.e., can have sequential fetch counts recorded) in these embodiments. Recall that this differs from embodiments in which count information is stored in the branch target buffer, which stores count information associated with CTIs or fetch groups—and not the corresponding target instruction(s)—and thus can only handle specified types of CTIs.

The retire queue then communicates the count to the sequential fetch logic, which stores, in an entry in the sequential fetch table associated with the target instruction, a record that indicates the count of the number of fetch groups (step 1002). For this operation, the sequential fetch logic determines an entry in the sequential fetch table into which the record is to be stored, such as by determining an address or a value based thereon of the target instruction and determining a corresponding entry in the sequential fetch table. The sequential fetch logic next stores, in the determined entry, the record that indicates the count of the number of fetch groups. For example, when the entry in the sequential fetch table includes space for an eight bit value, the sequential fetch logic stores an eight bit value representing the count in the entry. In the event that the entry is insufficient in size for storing the count (e.g., the count is more than 255 for an eight-bit count value), a default or zero value can be stored in the entry—thereby indicating that accesses of the branch predictor are to be performed (cannot be avoided) for the particular target instruction. Alternatively, a maximum value can be stored in the entry, thereby enabling the avoidance of at least some of the accesses of the branch predictor.

Figure 11:
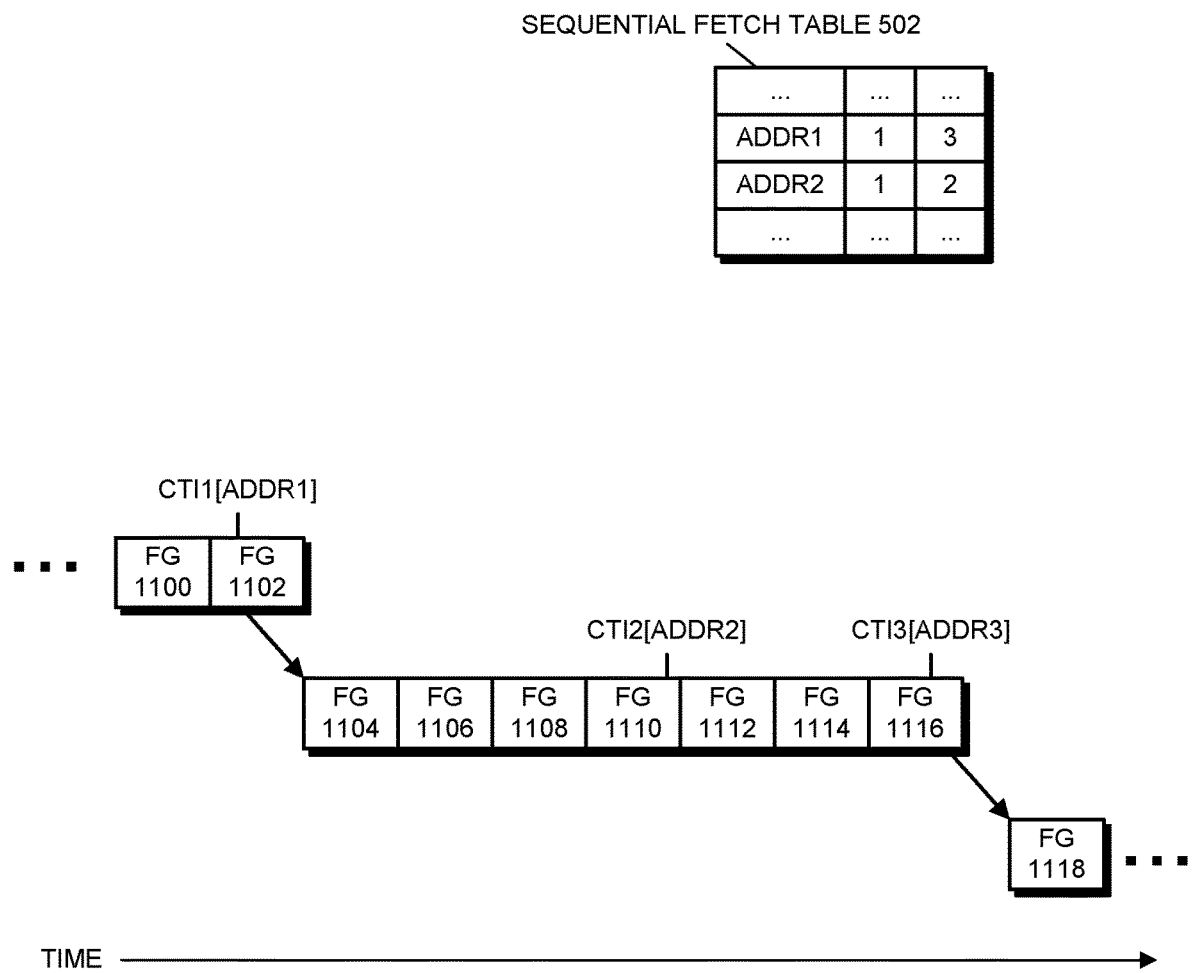
FIG. 11 presents a timeline diagram of operations for updating a sequential fetch table with a count of fetch groups that do not include CTIs that are fetched in sequence following corresponding CTIs in accordance with some embodiments.

FIG. 11 presents a timeline diagram of operations for updating a sequential fetch table with a count of fetch groups that do not include CTIs that are fetched in sequence following corresponding CTIs in accordance with some embodiments. As shown in FIG. 11, time proceeds from left to right, and during the time a number of fetch groups (FG) that each include separate sets of instructions from program code are fetched, prepared for execution (e.g., decoded, dispatched, etc.), executed, and retired. Each fetch group includes a number of individual instructions (e.g., four, six, etc.) and there are three CTI instructions among the instructions in the fetch groups.

In FIG. 11, a first CTI instruction, CTI1, which is the second instruction in fetch group 1102, is a static unconditional branch instruction that causes instruction flow to jump from fetch group 1102 at a first address to fetch group 1104 at a second, non-sequential address (ADDR1), which is illustrated by the arrow from the second instruction in fetch group 1102 to the initial instruction (at ADDR1) of fetch group 1104. Upon detecting the retirement of the target instruction at ADDR1, the initial instruction in fetch group 1104, retire queue keeps a count of a number of fetch groups that are retired in sequence (i.e., for which the constituent instructions are retired) before a subsequent CTI retires—which is a not-taken conditional CTI2 with a static target address that is the first instruction in fetch group 1112. Because three full fetch groups (fetch groups 1104-1108) retired before CTI2 retired, retire queue communicates an identification of the target instruction at ADDR1 (e.g., an address of, a processor instruction tag or internal identifier, etc.) and the count value of three or another value, such as the number of instructions that retired—13, to the sequential fetch logic. Upon receiving the identifier of the target instruction at ADDR1 and the value, sequential fetch logic updates a corresponding entry in the sequential fetch table as shown in the entry for ADDR1 in the example of the sequential fetch table in FIG. 11. Note that ADDR1 and ADDR2 as shown in the sequential fetch table in FIG. 11 may be the addresses ADDR1 and ADDR2 or other values representing or identifying the corresponding target instructions.

The retirement of the target instruction for CTI 2 at ADDR2 causes retire queue to commence a second/corresponding count. As described above, CTI2 is not taken, so the target instruction is at a next addresses in sequence, ADDR2—and fetch groups are fetched from ADDR2. The retire queue keeps a corresponding count until a subsequent CTI, CTI3 in fetch group 1116 (which directs program flow to fetch group 1118), retires. Because two full fetch groups (fetch groups 1112-1114) retired before CTI3 retired, retire queue communicates an identification of the target instruction at ADDR2 (e.g., an address of, a processor instruction tag or internal identifier, etc.) and the count value of two or another value, such as the number of instructions that retired 13, to the sequential fetch logic. Upon receiving the identifier of the target instruction at ADDR2 and the value, sequential fetch logic updates a corresponding entry in the sequential fetch table as shown in the entry for ADDR2 in the example of the sequential fetch table in FIG. 11.

In some embodiments, the retire queue employs at least one threshold for reporting counts to the branch target buffer and/or sequential fetch logic. In these embodiments, when less than the threshold number of fetch groups are counted, the retire queue does not report the CTI and/or the count to the sequential fetch logic. In this way, the retire queue can avoid thrashing the record (i.e., the branch target buffer or the sequential fetch table) in which the count is stored by causing entries to be rapidly overwritten. In some embodiments, the threshold is dynamic and can be set/reset at runtime as conditions dictate. In some embodiments, entries in the record (e.g., in the branch target buffer) may have their counts marked as invalid or set to a default value (e.g., 0) when less than the threshold number of fetch groups occur between a corresponding CTI or target instruction and the subsequent CTI.

Although the retire queue is described for the examples in FIGS. 8-11 as keeping the count of the number of fetch groups (or, more generally, retired individual instructions) that are retired in sequence before a subsequent CTI retires, in some embodiments, a different functional block keeps the count. Generally, in the described embodiments, any functional block that can identify individual CTI instructions and/or particular types of CTI instructions and count the number of instructions between identified CTI instructions can keep the count. For example, in some embodiments, a decode unit and/or a branch prediction unit performs some or all of the operations for keeping the count, although various roll-back and recovery operations may be performed for mispredicted branches.

Returning to FIG. 7, when subsequently executing program code, the sequential fetch logic determines, based on a record associated with a given CTI, that a specified number of fetch groups that have no CTIs are to be fetched for execution in sequence following the CTI (step 702). As used here, the record "associated with" a CTI can be a record associated with the CTI itself or the corresponding fetch group for embodiments in which the branch target buffer is used for storing the records, or can be a record associated with the target instruction of the CTI for embodiments in which the sequential fetch table is used for storing the records. Generally, upon encountering either a CTI or a target instruction (e.g., detecting either a CTI or a target instruction in a fetch group based on addresses or other information associated with instructions), the sequential fetch logic acquires, from the appropriate record, a count of the number of fetch groups having no CTIs that are to be fetched in sequence. As described above, the count can be a numerical, string, or other value that indicates the particular number of fetch groups.

The sequential fetch logic then, when each of the specified number of fetch groups is fetched and prepared for execution, prevents corresponding accesses of a branch prediction unit (e.g., branch prediction unit 212) for acquiring branch prediction information for instructions in that fetch group (step 704). Generally, during this operation, the sequential fetch table suppresses, blocks, or otherwise prevents accesses of the branch prediction unit, thereby avoiding unnecessarily consuming electrical power, etc. In some embodiments, in addition to preventing accesses of the branch prediction unit, sequential fetch logic also avoids performing the check for the count (as shown in step 702) until the operation in step 704 is complete—and may place functional blocks such as the sequential fetch table or some or all of the branch prediction unit in a low power mode.

Figure 12:
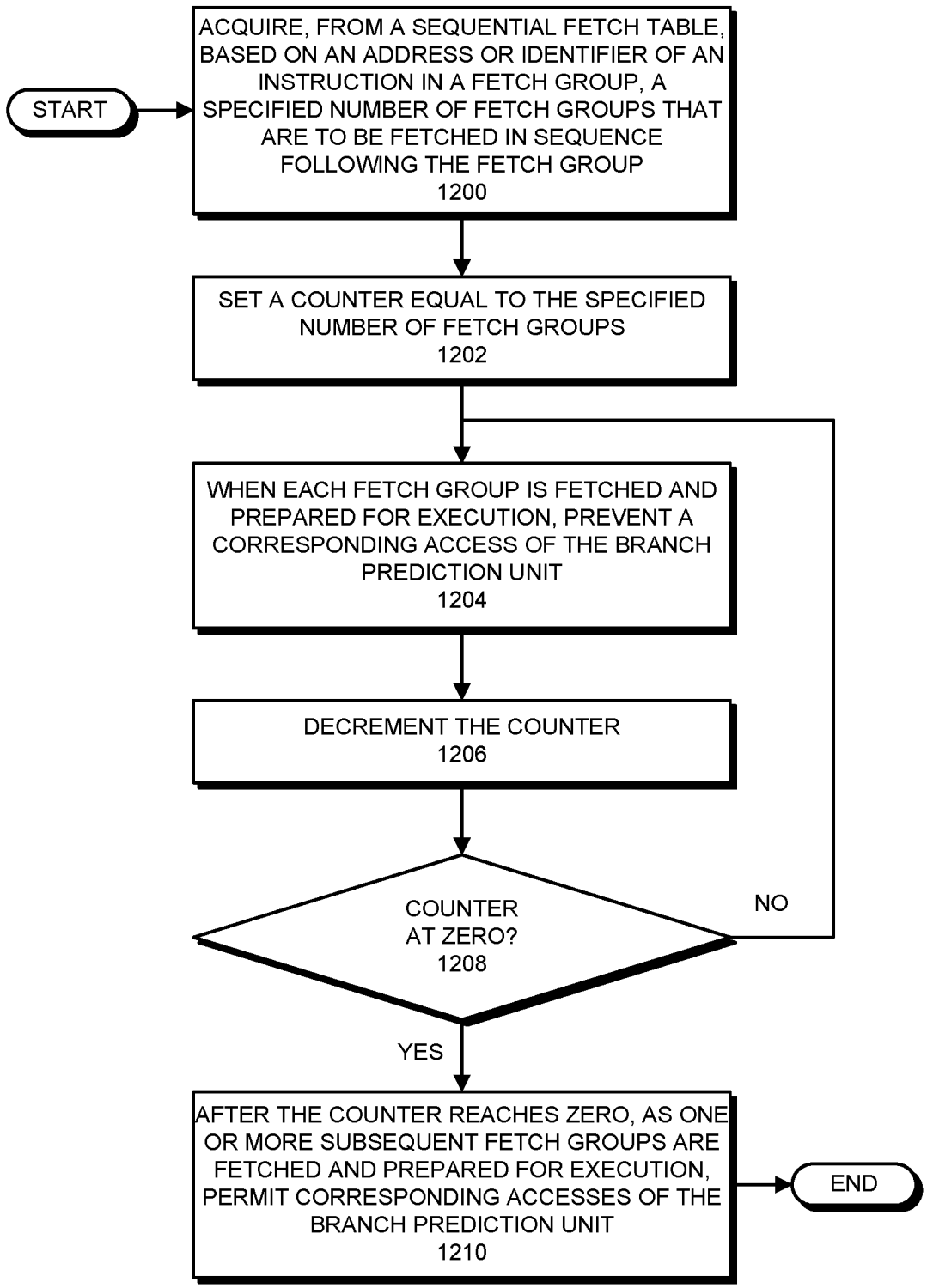
FIG. 12 presents a flowchart illustrating a process for determining a specified number of fetch groups that do not include CTIs to be fetched in sequence following a CTI and using the specified number for preventing accesses of a branch prediction unit in accordance with some embodiments.

FIG. 12 presents a flowchart illustrating a process for determining a specified number of fetch groups that do not include CTIs to be fetched in sequence following a CTI and using the specified number for preventing accesses of a branch prediction unit in accordance with some embodiments. Note that the operations shown in FIG. 12 are presented as a general example of operations performed by some embodiments. The operations performed by other embodiments include different operations, operations that are performed in a different order, and/or operations that are performed by different functional blocks. The operations of FIG. 12 are described in general terms with respect to steps 702-704 of FIG. 7 and thus FIG. 12 provides a more detailed description of steps 702-704.

For the operations in FIG. 12, it is assumed that sequential fetch records (i.e., records indicating a number of fetch groups that do not include CTI instructions that are to be fetched in sequence after CTIs) associated with CTI instructions (or, more specifically, target instructions thereof) are stored in a sequential fetch table as described above for FIGS. 7 and 10-11. Note, however, that similar operations are performed for an embodiment in which the sequential fetch records are stored in a branch target buffer, as described elsewhere herein. It is also assumed that the program counter (as supplied by a next PC functional block) indicates, prior to step 1200, that a fetch group is to be fetched that includes a target instruction for a CTI. It is further assumed that fetch groups include four instructions. These values and conditions are used for presenting the example in FIG. 12, however, and are not the same in all embodiments.

The operations in FIG. 12 start when a sequential fetch logic (e.g., sequential fetch logic 214) acquires, from a sequential fetch table, based on an address or identifier of an instruction in a fetch group, a specified number of fetch groups that are to be fetched in sequence following the fetch group (step 1200). For this operation, the sequential fetch logic uses the program counter to check whether there is a match or "hit" for any of the four instructions in the fetch group in the sequential fetch table. For example, sequential fetch logic can compute a hash value or another index value from the program counter (i.e., fetch address) that is compared to some or all of the entries in the sequential fetch table. As another example, sequential fetch logic can compute all of the addresses for the instructions in the fetch group based on the program counter and can compare each computed address with each entry in the sequential fetch table. As described above, an instruction in the fetch group is a target instruction for a CTI, so a match is found and a hit occurs in the sequential fetch table. The sequential fetch logic therefore reads the specified number of fetch groups from the matching entry in the sequential fetch table.

The sequential fetch logic then sets a counter equal to the specified number of fetch groups (step 1202). For example, the sequential fetch logic can store, in a dedicated counter register or other memory location, the specified number of fetch groups or a representation thereof.

When each fetch group is fetched and prepared for execution, the sequential fetch logic prevents a corresponding access of the branch prediction unit (step 1204). For example, the sequential fetch logic can assert one or more control signals to prevent circuit elements in the branch prediction unit from performing access operations, can prevent address or related values from being sent to the branch prediction unit, can halt clocks, power down circuit elements, and/or perform other operations to prevent the corresponding access of the branch prediction unit. For this operation, in some embodiments, each of two or more separate and possibly parallel accesses of the branch prediction unit such as branch direction resolution, branch address acquisition, etc. are all prevented by preventing, using some or all of the above-described techniques, respective functional blocks in the branch prediction unit from performing related operations.

Although not shown in FIG. 12, in some embodiments, accesses of the sequential fetch table are also prevented for fetch groups for which the counter is non-zero. This is done because it is known that the fetch groups do not include CTIs and thus do not include target instructions for CTIs, which renders such lookups needless. In some embodiments, the sequential fetch table is placed in a reduced power mode while the counter is non-zero. For example, the sequential fetch table may have controlling clocks are halted (e.g., via clock gating), electrical power reduced, have enable signals deasserted, etc, The sequential fetch logic also, as each fetch group is fetched and prepared for execution, decrements the counter (step 1206). For example, the sequential fetch logic can reduce the value of the counter in the dedicated counter register or other memory location by one, can transition the counter to a next lower value or representation thereof, etc.

Until the counter reaches zero (step 1208), the sequential fetch logic continues to prevent accesses of the branch prediction unit (step 1204) and decrement the counter (step 1206) as fetch groups are fetched and prepared for execution. After the counter reaches zero, i.e., after the last of the specified number of fetch groups has been fetched and is being prepared for execution, as one or more subsequent fetch groups are fetched and prepared for execution, the sequential fetch logic permits corresponding accesses of the branch prediction unit to acquire branch prediction information (step 1210). In other words, when the counter is equal to zero, the sequential fetch logic permits ordinary branch prediction operations such as branch target and branch direction prediction to be performed. In this way, the sequential fetch logic blocks branch prediction accesses (and possibly sequential fetch table accesses) when the count is non-zero in order to avoid unnecessary accesses of the branch prediction unit (and possibly the sequential fetch table).

Multi-Threaded Processor

In some embodiments, processor 102 in electronic device 100 is a multi-threaded processor and thus supports two or more separate threads of instruction execution. Generally, a multi-threaded processor includes functional blocks and/or hardware structures that are dedicated to each separate thread, but can also include functional blocks and/or hardware structures that are shared among the threads and/or which perform respective operations for more than one thread. For example, functional blocks such as the branch prediction unit and sequential fetch unit may perform branch prediction operations and branch prediction unit access prevention, respectively, for all threads. As another example, the sequential fetch table (in embodiments that use the sequential fetch table) may be implemented as a single sequential fetch table that is used for all threads (or some combination of multiple threads) or may be implemented on a per-thread basis, so that each thread has a corresponding separate sequential fetch table. In these embodiments, the records in each sequential fetch table are maintained for an associated thread and can be different from the records maintained in the sequential fetch tables for other threads. As yet another example, the sequential fetch logic may prevent accesses of the branch prediction unit on a per-thread basis, and thus may maintain a separate and independent counter for each thread that is used as described herein for preventing accesses of the branch prediction unit for the corresponding thread.

As described above, in some embodiments, while preventing accesses of a branch prediction unit for sequentially fetched fetch groups that do not include CTIs following a CTI, the sequential fetch logic may also prevent accesses of the sequential fetch table and place the sequential fetch table in a reduced power mode. In these embodiments, when multiple threads depend on the sequential fetch table (when one sequential fetch table is used to hold records for two or more threads), the sequential fetch table may remain in a full power mode/active to service other threads (and thus will not be transitioned to the reduced power mode). The same holds for the branch prediction unit; when only a single thread is using the branch prediction unit, the branch prediction unit may be placed in a reduced power mode when accesses are being prevented. When the branch prediction unit is being used by two or more threads, however, the branch prediction unit may be left in a full power mode/ active to service other threads. The particular accesses are not made for specific threads, however, as described herein.

In some embodiments, an electronic device (e.g., electronic device 100, and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), functional blocks, system management units, power controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., processor 102, memory 104, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using the same letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device that handles control transfer instructions (CTIs) when executing instructions in program code, the electronic device comprising:
   a processor that includes:
      a branch prediction functional block; and
      a sequential fetch logic functional block;
   wherein the sequential fetch logic functional block:
      determines, based on a count of a number of fetch groups that are to be fetched for execution in sequence before a subsequent CTI retires from a record associated with a CTI, that a specified number of fetch groups of instructions that were previously determined to include no CTIs are to be fetched for execution in sequence following the CTI; and
      when each of the specified number of fetch groups is fetched and prepared for execution before instructions in that fetch group are dispatched to one or more execution units for execution, prevents corresponding accesses of the branch prediction functional block for acquiring branch prediction information for instructions in that fetch group.

2. The electronic device of claim 1, wherein the processor further includes:
   a branch target buffer (BTB) associated with the branch prediction functional block;
   wherein the sequential fetch logic functional block:
      upon detecting a specified type of CTI, keeps a count of a number of fetch groups that are retired in sequence before a subsequent CTI retires; and
      stores, in an entry in the BTB associated with the CTI, a record that indicates the count of the number of fetch groups.

3. The electronic device of claim 2, wherein the specified type of CTI includes unconditional CTIs having a static target instruction or conditional CTIs for which a non-taken path is directed to a static target instruction.

4. The electronic device of claim 2, wherein the sequential fetch logic functional block:
   stores, in the entry in the BTB associated with the CTI, the record that indicates the count of the number of fetch groups only when the count of the number of fetch groups is greater than a threshold value.

5. The electronic device of claim 1, wherein the processor further includes:
   a sequential fetch table (SFT);
   wherein the sequential fetch logic functional block:
      upon a retirement of a target instruction for a CTI retiring, keeps a count of a number of fetch groups that are retired in sequence before a subsequent CTI retires; and
      stores, in an entry in the SFT associated with the target instruction for the CTI, a record that indicates the count of the number of fetch groups.

6. The electronic device of claim 5, wherein the sequential fetch logic functional block:
   stores, in the entry in the SFT associated with the target instruction for the CTI, the record that indicates the count of the number of fetch groups only when the count of the number of fetch groups is greater than a threshold value.

7. The electronic device of claim 1, wherein, when preventing corresponding accesses of the branch prediction functional block for acquiring branch prediction information when each of the specified number of fetch groups is fetched and prepared for execution, the sequential fetch logic functional block is configured to:
   set a counter equal to the specified number of fetch groups;
   when each fetch group is fetched and prepared for execution and the corresponding access of the branch prediction functional block is prevented, decrement the counter; and
   after the counter reaches zero, as one or more subsequent fetch groups are fetched and prepared for execution, permit corresponding accesses of the branch prediction functional block to be performed to acquire branch prediction information for instructions in the one or more subsequent fetch groups.

8. The electronic device of claim 1, wherein the branch prediction functional block comprises:
   a branch target buffer (BTB); and a branch direction predictor;
wherein, when preventing the accesses of the branch prediction functional block, the sequential fetch logic functional block prevents at least accesses of the BTB and the branch direction predictor.

9. The electronic device of claim 1, wherein, while each of the specified number of fetch groups is fetched and prepared for execution:
preventing accesses of one or more functional blocks that store records associated with CTIs; and
placing the one or more functional blocks in a reduced power mode.

10. The electronic device of claim 1, wherein each fetch group includes a predetermined number of instructions that are fetched in a same transfer operation to be prepared for execution in the processor.

11. The electronic device of claim 1, wherein preventing corresponding accesses of the branch prediction functional block includes preventing at least one operation that consumes electrical power, thereby conserving electrical power.

12. A method for handling control transfer instructions (CTIs) when executing instructions in program code in an electronic device having a processor that includes a branch prediction functional block and a sequential fetch logic functional block, the method comprising:
determining, by the sequential fetch logic functional block, based on a count of a number of fetch groups that are to be fetched for execution in sequence before a subsequent CTI retires from a record associated with a CTI, that a specified number of fetch groups of instructions that were previously determined to include no CTIs are to be fetched for execution in sequence following the CTI; and
when each of the specified number of fetch groups is fetched and prepared for execution before instructions in that fetch group are dispatched to one or more execution units for execution, preventing, by the sequential fetch logic functional block, corresponding accesses of the branch prediction functional block for acquiring branch prediction information for instructions in that fetch group.

13. The method of claim 12, wherein the processor further includes a branch target buffer (BTB) associated with the branch prediction functional block, and wherein the method further comprises:
upon detecting a specified type of CTI, keeping, by the processor, a count of a number of fetch groups that are retired in sequence before a subsequent CTI retires; and
storing, by the sequential fetch logic functional block, in an entry in the BTB associated with the CTI, a record that indicates the count of the number of fetch groups.

14. The method of claim 13, wherein the specified type of CTI includes unconditional CTIs having a static target instruction or conditional CTIs for which a non-taken path is directed to a static target instruction.

15. The method of claim 13, further comprising:
storing, in the entry in the BTB associated with the CTI, the record that indicates the count of the number of fetch groups only when the count of the number of fetch groups is greater than a threshold value.

16. The method of claim 12, wherein the processor further includes a sequential fetch table (SFT), and wherein the method further comprises:
upon a retirement of a target instruction for a CTI, keeping, by the processor, a count of a number of fetch groups that are retired in sequence before a subsequent CTI retires; and
storing, by the sequential fetch logic functional block, in an entry in the SFT associated with the target instruction for the CTI, a record that indicates the count of the number of fetch groups.

17. The method of claim 16, further comprising:
storing, in the entry in the SFT associated with the target instruction for the CTI, the record that indicates the count of the number of fetch groups only when the count of the number of fetch groups is greater than a threshold value.

18. The method of claim 12, wherein preventing corresponding accesses of the branch prediction functional block for acquiring branch prediction information when each of the specified number of fetch groups is fetched and prepared for execution comprises:
setting, by the sequential fetch logic functional block, a counter equal to the specified number of fetch groups;
when each fetch group is fetched and prepared for execution and the corresponding access of the branch prediction functional block is prevented, decrementing, by the sequential fetch logic functional block, the counter; and
after the counter reaches zero, as one or more subsequent fetch groups are fetched and prepared for execution, permitting, by the sequential fetch logic functional block, corresponding accesses of the branch prediction functional block to be performed to acquire branch prediction information for instructions in the one or more subsequent fetch groups.

19. The method of claim 12, wherein the branch prediction functional block comprises a branch target buffer (BTB) and a branch direction predictor, and wherein preventing the accesses of the branch prediction functional block comprises preventing at least accesses of the BTB and the branch direction predictor.

20. The method of claim 12, wherein each fetch group includes a predetermined number of instructions that are fetched in a same transfer operation to be prepared for execution in the processor.

21. The method of claim 12, further comprising, while each of the specified number of fetch groups is fetched and prepared for execution:
preventing, by the sequential fetch logic functional block, accesses of one or more functional blocks that store records associated with CTIs; and
placing, by the sequential fetch logic functional block, the one or more functional blocks in a reduced power mode.

22. The method of claim 12, wherein preventing corresponding accesses of the branch prediction functional block includes preventing at least one operation that consumes electrical power, thereby conserving electrical power.

* * * * *